United States Patent
Everett

[15] 3,656,261
[45] Apr. 18, 1972

[54] CUTTING DEVICE CONTROL

[72] Inventor: Charles T. Everett, Warren, Ohio
[73] Assignee: Everett Industries Incorporated, Warren, Ohio
[22] Filed: Aug. 28, 1970
[21] Appl. No.: 67,807

[52] U.S. Cl. ...................... 51/99, 51/134.5 R, 51/281 R, 83/490, 83/523
[51] Int. Cl. ............... B24b 1/00, B24b 51/00, B24b 47/06
[58] Field of Search ................ 51/99, 2 UA, 134.5, 281 R, 51/47, 98 R, 35, 34 R, 34 J, 165.9, 165.92; 83/490, 523; 143/46, 53, 58

[56] References Cited

UNITED STATES PATENTS

| | | | |
|---|---|---|---|
| 2,168,596 | 8/1939 | Hall | 51/165.9 X |
| 2,467,161 | 4/1949 | Sheeley | 51/98 R |
| 2,649,646 | 8/1953 | Remmen | 83/490 X |
| 2,763,967 | 9/1956 | Hardy | 51/165.9 X |
| 2,797,532 | 7/1957 | Lowe | 51/165.92 X |
| 2,836,015 | 5/1958 | Stone | 51/98 R |
| 2,955,388 | 10/1960 | Lavner | 51/35 |
| 3,330,072 | 7/1967 | Janis | 51/35 |

Primary Examiner—Donald G. Kelly
Attorney—Michael Williams

[57] ABSTRACT

The invention relates to methods of and apparatus for controlling relative movement between a cutting device and an object to be cut and is particularly useful to regulate movement of an abrasive cut-off disc to compensate for wear of the disc. The invention utilizes the known fact that the drive motor for the disc requires less power when the disc is out of contact with the work than when the disc is actually cutting the work. An electrical control circuit is responsive to the amount of power drawn by the motor, to return the cutting disc to its non-cut position immediately after the disc has cut through the work.

10 Claims, 6 Drawing Figures

PATENTED APR 18 1972 3,656,261
SHEET 1 OF 2
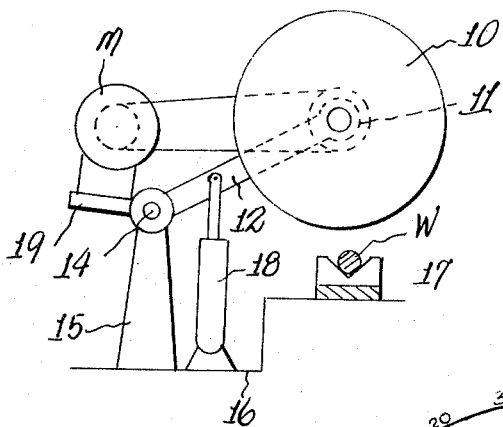
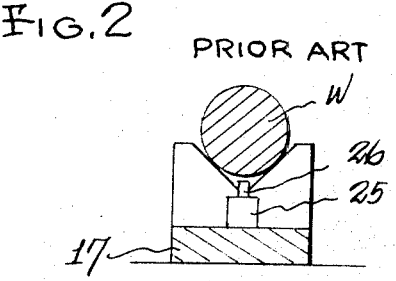
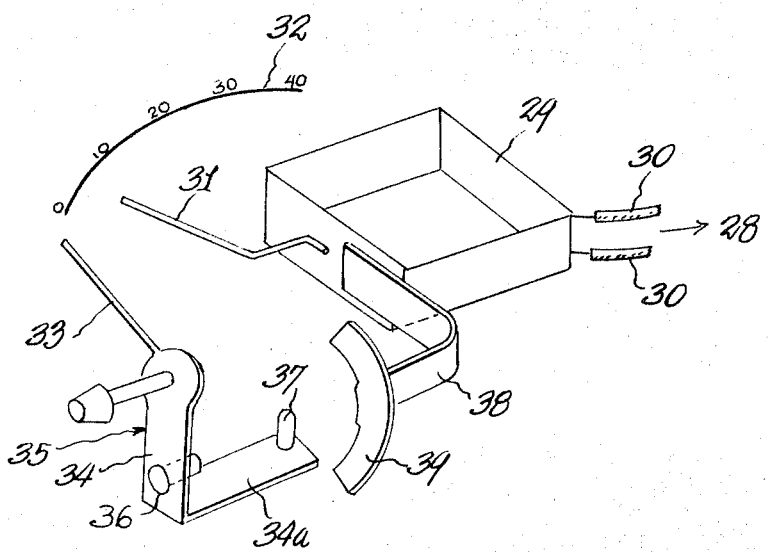
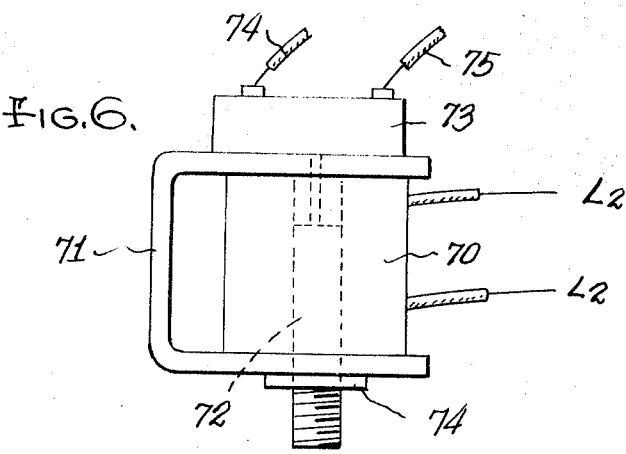
INVENTOR.
CHARLES T. EVERETT
BY Michael Williams
ATTORNEY

3,656,261

CUTTING DEVICE CONTROL

BACKGROUND AND SUMMARY

It is desirable to limit the movement of a cutting device with respect to work to be cut, not only to conserve time in the cutting operation, but also to prevent undue wear of the cutting device and to compensate for wear of the latter. This is particularly important where the cutting device is an abrasive disc.

The control of movement may be made manually, but this requires the constant observation of an operator and thus increases labor cost. Heretofore, limit switches have been disposed for contact with either the disc, or a part carrying the disc, but these have not been satisfactory because of the dust and moisture in the environment of the cutting operation.

My invention enables the control to be removed from close positionment with respect to the cutting operation and therefore overcomes the difficulty of having the control, or an actuating part thereof, affected by dust resulting from the cutting or moisture resulting from the coolant used during cutting. The invention is based upon the fact that the motor which rotates the cutting disc requires a greater amount of power during the actual cutting action than it does during non-cutting operation, and a simple control circuit, embodying reliable components may therefore be provided to accurately compensate for wear of the cutting disc.

DESCRIPTION OF THE DRAWINGS

In the drawings accompanying this description and forming a part of this specification, there are shown, for purposes of illustration, several embodiments which my invention may assume, and in these drawings:

FIG. 1 is a schematic representation of an abrasive cut-off saw, illustrating construction in which my invention may be embodied, FIG. 2 is a schematic representation of a prior art device, FIGS. 5 and 6 illustrate control elements used in said embodiment.

DESCRIPTION OF PREFERRED EMBODIMENT

Figure 3:
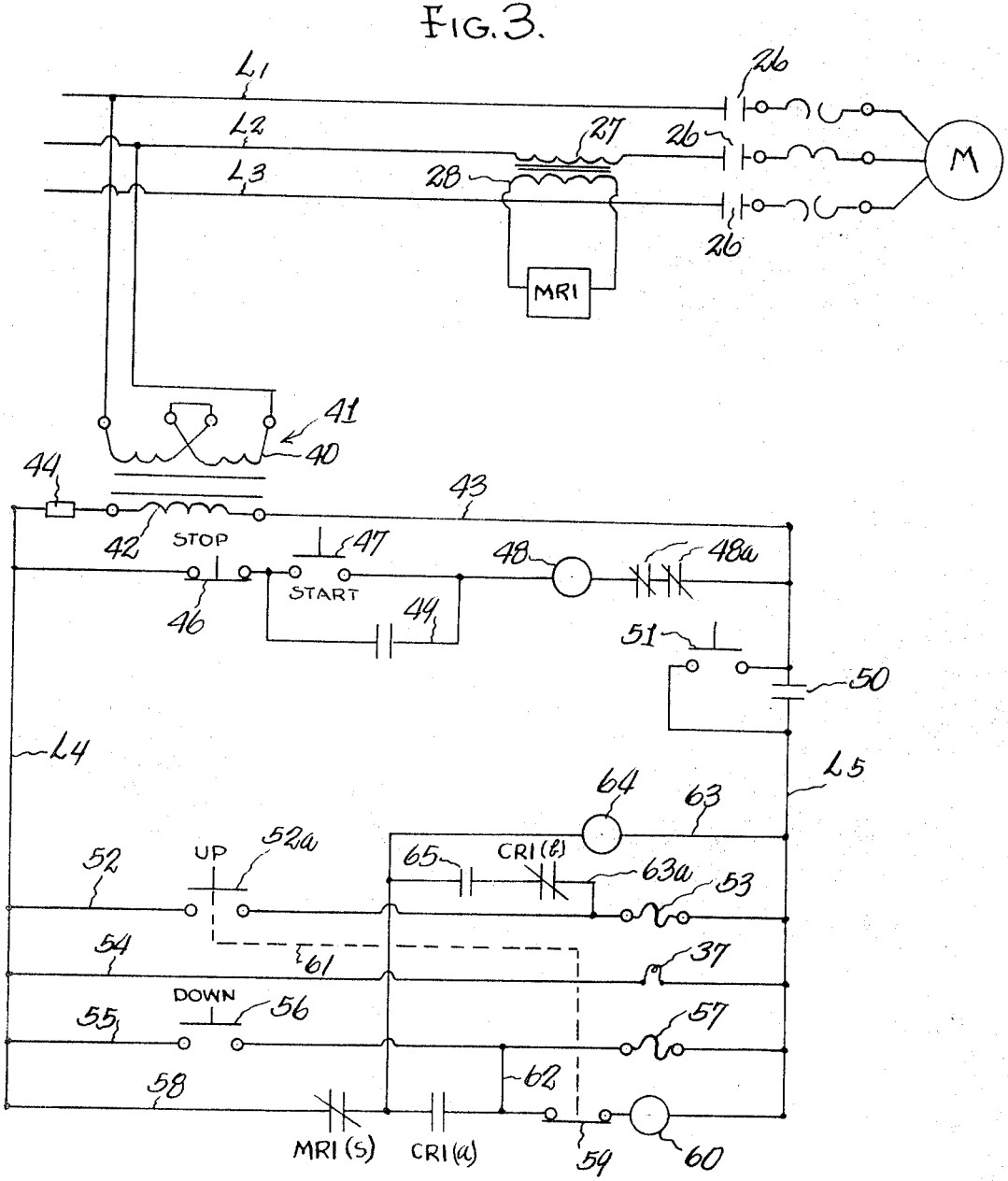
FIG. 3 is an electrical diagram illustrating a control circuit embodying my invention, FIG. 4 discloses a representation of a control valve used in the disclosed embodiment.
Figure 4:
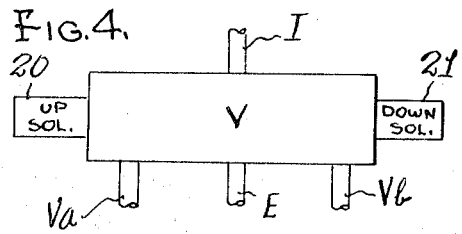

My invention is adapted for the control of relative movement between a cutting device and an object to be cut and has particular usefulness in a severing apparatus comprising an abrasive cutting disc of the general type shown in my U.S. Pat. No. 3 514 906. Referring to FIG. 1, wherein an abrasive disc construction is schematically disclosed, the abrasive disc 10 is carried for rotation by a bearing 11 located at one end of an arm 12. The other end of the arm is rotatable in a bearing 14 carried by a standard 15 from a base 16 of the machine.

An anvil 17 is also mounted on the base and provides a cradle for the work W which is to be cut. A fluid cylinder 18 has its piston rod pivotally connected to the arm 12 and is adapted to effect swinging movement of the arm about the pivot formed by the bearing 14, to move the abrasive disc 10 toward and away from the work W. A main drive motor M is carried by a platform 19 which is swingable about the pivot formed by the bearing 14. The motor M has belt connection with a pulley fixed to the shaft which carries the abrasive disc 10.

The fluid cylinder 18 is connected in circuit with a source of fluid pressure (not shown) and this circuit includes a four-way valve V (see FIG. 2) having "Up" and "Down" solenoids 20,21 respectively, at its opposite ends for moving the valve plunger in opposite directions. The valve V may be standard construction and need not be shown in detail. The valve V has an inlet port, an exhaustport, and two ports respectively connected to lines leading to opposite ends of the cylinder 18. The solenoids shift the valve plunger from one position to the other and the plunger remains in its positions until positively shifted by one or the other solenoid.

When the plunger of the valve V connects the line I from the source of fluid pressure to the line Va leading to the blank end of the cylinder 18, the piston rod of such cylinder will be extended to swing the arm 12 upwardly and move the abrasive disc in a direction away from the work. At this time, the plunger of the valve V connects the line Vb leading from the rod end of the cylinder 18 to exhaust E.

On the other hand, when the plunger of the valve V connects the line I from the source of fluid pressure to the line Vb leading to the rod end of the cylinder 18, the piston rod of such cylinder will be retracted to swing the arm 12 downwardly and move the abrasive disc in a direction toward and through the work W, to sever the latter. At this time, the plunger of the valve V connects the line Va leading from the blank end of the cylinder to exhaust.

In abrasive cutting devices, when the abrasive disc 10 is relatively new, the arm 12 need have only a relatively small amount of movement in order to engage the workpiece W, but as the disc wears and becomes smaller in diameter, a greater amount of movement is necessary from the predetermined "Up" position. Heretofore, it has been difficult to compensate for change in diameter as the abrasive disc 10 wears. If the control for the cylinder 18 were set for maximum movement, the disc when of large diameter may strike the base of the anvil 17 and be unnecessarily worn or may damage the anvil. On the other hand, if the cylinder control were set to sever the work and then retract, such setting would not be proper when the disc wears and reduces in diameter, and the workpiece may not be completely severed.

Heretofore, a proximity limit switch 25 (see FIG. 2) was mounted on the base of the anvil, the switch having a tungsten carbide button 26 which was engaged just shortly after the disc cut completely through the work, to operate the switch and effect an upward movement of the arm 12. However, this was not completely satisfactory since the area in which the switch had to be located is subjected to grinding dust and coolant fluid which affected the reliability of the switch.

I have discovered that a very efficient and reliable control may be provided which is based on the fact that the main driving motor M draws more electrical current during the time the abrasive disc is cutting through the work, and FIGS. 1 through 5 illustrate an embodiment my invention may assume.

Since considerable power is required to effect cutting of work of relatively large cross sections, the electric motor M is shown in FIG. 3 as being connected to a source of 220 or 440 volt three-phase current, including lines L1, L2 and L3; however, it is to be understood that my invention is equally adapted for use with a motor energized from a single phase source.

As seen in FIG. 3, line L1, L2 and L3 have motor starters 26 in series therein which are operable to pass electric current to the main motor M. A transformer has its primary winding 27 interposed in one line (line L2) and the secondary winding 28 of the transformer is connected to opposite sides of a relay of suitable form, preferably a control meter relay or a trip current relay.

FIG. 5 schematically shows a control meter relay made by Beede Electrical Instrument Company, which may be connected in series with the secondary winding 28 of the transformer. Such control meter relay comprises a rotatably mounted meter coil 29 which has leads 30 connected to the opposite sides of the secondary winding 28. The primary winding 27 of the transformer monitors the flow of current to the main motor in the range, for example, of 0 to 50 amperes, while the secondary winding 28 monitors flow of current to the control meter relay in the range, for example, of 0 to 5 amperes. An indicating pointer 31 is fixed to the meter coil and is adapted to sweep over an indicating scale 32 to indicate the amperes, or milliamperes, flowing to the coil 29. A set pointer 33 is fixed to the upright leg 34 of a rotatably mounted bracket 35. A photo-conductive cell 36 is carried by the upright leg 34, and the horizontal leg 34a of the bracket carries a small electric bulb 37 which will be illuminated at all times that the main motor is operating, as will be later explained.

A bracket 38 is fixed to the metercoil 29 and rotates with the latter. The bracket 38 carries an arcuate shield 39 which is adapted to block rays from the light 37 from striking the photo-conductive cell 36. The set pointer 33 may be adjusted so that the shield 39 will interrupt the rays from the light 37 at any desired position of the indicating pointer 31. The interruption of the rays from the light 37 changes the resistance of the photo-conductive cell to switch an electronic circuit that energizes or de-energizes an output relay which is not shown but is well known in the Beede meter. As long as the indicating pointer 31 remains below the set pointer (on the scale 32) switch contacts MRI (s) (hereinafter related in an electrical control circuit) will remain closed. As the indicating pointer 31 goes beyond the set pointer 33 (by reason of an increased draw of current when the abrasive disc 10 starts to cut the work) the shield 39 will block the rays from light 37 and the electronic circuit will cause the switch contacts MRI (s) to open.

A control circuit (see FIG. 3) is adapted to be energized from lines L1 and L2, and includes the primary 40 of a transformer 41 connected to lines L1 and L2, and a secondary 42 connected to lines L4 and L5 of the control circuit. The primary is shown as wired to convert 440 volts in the lines L1, L2 and L3 to 110 volts in the control circuit, although by a simple wiring change, the primary may convert 220 volts (if such is used) to 110 volts in the control circuit. The secondary 42 is connected in series in a conductor 43 across the lines L4 and L5 with a fuse 44 in series as protection.

A conductor 45 is connected across the lines L4 and L5, and in series in this conductor are normally closed, manually operable "Stop" switch 46, normally open, manually operable "Start" switch 47, the operating coil 48 of a relay, and normally closed overload contacts 48a which are affected by an excessive draw of current when the main motor is overloaded to break the circuit to the relay coil 48 and thus interrupt flow of current to the main motor. Switch contacts 49 are wired around the normally open "Start" switch 47. When the "Start" switch is momentarily closed by an operator, the coil 48 is energized to close switch contacts 49 to provide a holding circuit around the "Start" switch. Energization of relay coil 48 also effects closing of the motor starters 26 to effect operation of the main motor M. A starter switch 50 is mechanically connected to the motor starter switches 26 in any suitable manner, so that when the starter switches 26 are closed by energization of the coil 48 the starter switch 50 is simultaneously closed, and vice versa. A manually operable push button 51 is wired around the starter switch 50 and is closed by the operator when the abrasive disc 10 jams, or the main motor is otherwise stalled, as will be later explained.

A conductor 52 is connected across lines L4 and L5 and in series in this conductor are normally open, manually operable "Up" switch 52a and the operating coil 53 of "Up" solenoid 20. A further conductor 54 is connected across the lines L4 and L5, and the bulb 37 of the control meter relay is in series in this conductor so that the filament of the bulb is energized at all times that current is flowing in the control circuit.

A conductor 55 is connected across the lines L4 and L5 and in series in this conductor are normally open, manually operable "Down" switch 56 which is spring-pressed to open position, and the operating coil 57 of the "Down" solenoid 21.

A conductor 58 is connected across the lines L4 and L5 and in series in this conductor are the switch contacts MRI (s) of the control meter relay, normally open contacts CRI (a) operated by the relay coil 60, a normally closed switch 59 and the operating coil 60 of the relay. The switch 59 has a mechanical tie 61 with the "Up" switch 52a and is opened simultaneously with the closing of switch 52a.

A conductor 62 is connected between conductors 55 and 58. A further conductor 63 is connected between conductor 52 and line L5. In series in the conductor 63 is the coil 64 of a time delay. A branch conductor 63a leads from conductor 63 to conductor 52, and in series in conductor 63a, are normally open contacts 65 of the time delay, and normally closed contacts CRI(b) operated by the coil 60 of the relay.

To operate the main motor and to simultaneously energize the control circuit, the operator depresses, and then releases, the "Start" switch 47. Momentarily closure of the "Start" switch energizes the coil 48 to close the motor starters 26 to start the main motor and simultaneously close the contacts 49 to complete a holding circuit around the "Start" switch. Because of the mechanical tie between the motor starters 26 and the starter switch 50, the latter is also closed.

Since the abrasive disc is rotating freely and out of engagement with the work W, the main motor M draws a relatively low amount of current and therefore the secondary 28 monitors a proportionally small amount of current which is insufficient to rotate the coil 29 an amount to cause the shield to block the light rays from light 37 from striking the photo-conductive cell 36. Therefore, under these conditions the control meter switch contacts MRI (s) are closed and current flows through line L4 to conductors 58 and 63, the coil 64 of the time delay, (which will close the contacts 65 after a time interval) so that current will then flow through the closed contacts 65, the normally closed contacts CRI(b) and the operating coil 53 of "Up" solenoid 20. Prior to a cutting operation, the valve V is usually in position wherein the cylinder 18 holds the abrasive disc 10 in its up position, so no operation is effected up to now, except in the event the disc is not fully up, in which event it is moved to that position.

When the operator desires to initiate a cutting operation, he momentarily depresses the "Down" switch 56 to cause current to flow from line L4, through switch 56, operating coil 57 of the "Down" solenoid 21 and line L5. This causes solenoid 21 to shift the plunger of valve V to connect the rod end of the cylinder 18 with fluid pressure, and the valve plunger remains in this position so that the abrasive disc is moved to and through the work W.

Momentary closure of the "Down" switch 56 also energizes the coil 60 through conductor 62 and closed switch 59 and energization of this coil will cause the relay to close contacts CRI (a) and open contacts CRI (b), and opening of the latter contacts interrupts flow of current to the coil 53 of "Up" solenoid 20 to permit shifting of the valve plunger.

When the abrasive disc 10 engages the work W and starts its cutting action, the main motor M, which drives the disc, draws a greater amount of current and the set pointer 33 of the control meter relay is set so that the rays from the light 37 are blocked by the shield 39 when the meter coil has been rotated by the greater amount of current drawn. Accordingly, no light rays strike the photo-conductive cell 36 and this in turn affects the output relay built into the control meter so that the contacts MRI(s) are opened. At the same time the contacts MRI (s) are opened, the relay coil 60 is deenergized to thereby again open contacts CRI(a) and again close contacts CRI(b). However, since the plunger of valve V remains in its shifted position, cutting action will continue until the cut is completed.

When the cut is completed, the main motor M will again draw only a reduced amount of current, thus causing the meter coil 29 to rotate and the indicating pointer to sweep downwardly along the scale 32 to a point where it is below the set pointer 33, at which point the shield no longer blocks the rays from the light 37 and such rays strike the photo-conductive cell 36, whereupon the contacts MRI (s) are again closed. Closure of contacts MRI (s) will again permit current to flow through conductor 63 to time delay coil 64 to effect operation of the time delay in any suitable, well known manner to delay closure of contacts 65 for predetermined period. This time delay is desirable to delay "Up" movement of the abrasive disc for a short period of time to permit the disc to smooth the cut edges of the severed work. After the predetermined delay of time, the time delay 64 closes the contacts 65 to permit flow of current to the coil 53 of "Up" solenoid and thereby shift the plunger of valve V to admit pressure fluid to the blank end of cylinder 18 and thus raise the abrasive disc 10 to its "Up" position.

In the event of a mis-cut, or in the event the operator suddenly decides to halt downward movement of the abrasive disc after he had closed the "Down" switch 56, the operator may press the "Up" switch 52a to close it and simultaneously (through the mechanical tie 61) open switch 59, whereby flow of current in conductors 55 and 56 is halted, and the coil 53 of "Up" solenoid is connected across the lines L4 and L5.

In the event the abrasive disc is jammed during its cutting action, and stalls the motor, the overload contacts 48a will open to deenergize the coil 48 and thereby open the motor starters 26 and interrupt current flow to the main motor, and simultaneously open switch 50 which is mechanically tied to starters 26. However, the operator may still utilize the control circuit to bring the abrasive disc to its "Up" position by depressing the switch 51, whereupon current may flow from line L4 through conductor 58, closed contacts MRI (s), conductor 63, closed contacts 65, (after coil 64 closes contacts 65) and normally closed contacts CRI (b) to the operating coil of "Up" solenoid 20. It will be noted that contacts MRI (s) are closed since the main motor M has been halted and therefore draws no current.

It is possible to build a time delay directly into the Beede control meter relay to delay the closing of contacts MRI (s) and thereby eliminate the necessity of the time delay 64 and its operating contacts 65.

Instead of the control meter relay heretofore described, an instantaneous trip current relay generally corresponding to that shown in Bulletin 809 of the Allen Bradley Company may be used. FIG. 6 shows a construction schematically illustrating a relay of this type, comprising a solenoid coil 70 which in this case may be directly connected in series in line L2 to directly monitor the current flowing therein. The coil 70 is carried by a bracket 71 for attachment to a support. An iron core 72 is movable within the coil and mounted on top of the bracket 71 is a snap action switch 73 which corresponds to the contacts MRI (s) and which has conductors 74, 75 connected in series in conductor 58 heretofore mentioned, and which cause the switch 73 to control current flow in the conductor 58 much the same as the contacts MRI (s).

The current drawn by the main motor M, as directly reflected in the coil 70, exerts a magnetic pull upward on the iron core, but when the main motor M is running at no load, this pull is insufficient to lift the core to operate the switch 73 so that contacts in this switch remain closed. When the abrasive disc 10 engages the work W, the upward surge of current causes the core 72 to be lifted to actuate the switch 73 and open its contacts. The lower end of the core 72 is threaded to receive an adjusting nut 74 for the purpose of adjusting the position of the core within the coil 70. By lowering the core 72, the magnetic flux is weakened and higher current is required to lift the core sufficiently to trip the switch 73. The core will fall when the main motor returns to no load condition (after the work has been severed) and the switch 73 automatically closes its contacts.

I claim:

1. In apparatus for severing work, a cutting device, a first motor for effecting cutting operation of said cutting device, and a second motor for moving said operating cutting device to and through said work and for returning it to a non-cutting position, the improvement comprising means for monitoring the power required by said first motor during work cutting and non-cutting operations, including electrical switch contacts affected by said monitoring means and included in an electrical circuit which controls operation of said second motor, said switch contacts being set in one position by said monitoring means when said first motor requires a greater amount of power for the cutting operation, and said switch contacts being moved to another position by said monitoring means when said first motor requires a decreased amount of power upon completing of the cutting action, said switch contacts in said other position affecting said control circuit to cause actuation of said second motor means to return said cutting device to non-cutting position removed from the work.

2. In apparatus for severing work, comprising a rotatable cutter, an electric motor for rotating said cutter, a further motor for moving said cutter to and through the work and for returning it to non-cutting position, the improvement comprising a current relay for monitoring the current flow from an electrical power source to said electric motor, electrical switch contacts affected by said current relay and included in an electrical circuit which controls operation of said further motor, said switch contacts being set in one position by said current relay when said electric motor requires a greater amount of power for the cutting operation of said disc, and said switch contacts being moved to another position by said current relay when current flow to said electric motor decreases upon completion of the cutting operation of said disc, said switch contacts in said other position affecting said electrical circuit to cause actuation of said further motor to return said cutting disc to a non-cutting position removed from the work.

3. The construction according to claim 2 wherein said current relay is a control meter relay which is connected across the secondary of a transformer, the transformer primary being connected in series in a power line leading to the electric motor.

4. The construction according to claim 3 wherein said control meter relay comprises a rotatably mounted meter coil which rotates an amount proportional to the current demand of said electric motor, a photo-conductive cell for operating said switch contacts, an electric light whose rays affect operation of said cell, and a shield carried by said meter coil for blocking rays to said cell when said electric motor requires a greater amount of current.

5. In apparatus for severing work, comprising a rotatable cutter, an electric motor for rotating said cutter, a fluid cylinder for moving said cutter to and through the work and for returning it to a non-cutting position clear of the work, and a fluid valve for controlling flow of pressure fluid to opposite ends of said fluid cylinder, the plunger of said valve being movable to one position by a first solenoid to actuate the piston in said cylinder in a direction to cause it to move said cutter to and through the work, and said plunger being movable to another position by a second solenoid to actuate the piston in said cylinder in an opposite direction to cause it to move said cutter to a non-cutting position removed from the work, the improvement comprising a current relay for monitoring the current flow from an electrical power source to said electric motor, electrical switch contacts affected by said current relay and included in an electrical control circuit with said first and second solenoids, said switch contacts being held in closed position by said current relay when said electric motor draws a relatively light amount of current during non-cutting rotation to cause energization of said second solenoid and hold or move said cutter to non-cutting position, a manually operable switch in said control circuit closed momentarily to energize said first solenoid and simultaneously cause opening of said switch contacts to deenergize said second solenoid, whereby said cutter is movable to and through the work, and said switch contacts being again closed by said current relay when said cutter has completed the cut and again draws a relatively light amount of current to again energize said second solenoid to shift said valve plunger to cause said cylinder to return said cutter disc to non-cutting position.

6. The construction according to claim 5 and further including a time delay for holding said cutter in the cut of said work to smooth edges of the cut following said cutting operation and prior to return of said cutter to non-cutting position.

7. The construction of claim 5 wherein said current relay is a control meter relay which is connected across the secondary of transformer, the transformer primary being connected in series in a power line leading to the electric motor.

8. The construction of claim 5 wherein the current relay is an instantaneous trip current relay with the coil of the latter disposed in series in a power line leading to the electric motor.

9. A method of controlling operation of apparatus used for severing work, wherein the apparatus comprises a cutting device, a first motor for effecting operation of said cutting device, and a second motor for moving the operating cutting device to and through cutting action with respect to the work and thereafter returning it to a non-cutting position, the method relating to the control of operation of said second motor and comprising monitoring the power required by said first motor during the non-cutting and cutting operations, setting a control circuit by the increased amount of power required by said first motor during the cutting operation, and triggering the control circuit by the reduced amount of power required by said first motor upon completion of the cutting action to influence said second motor to return said cutting device to non-cutting position.

10. A method of controlling operation of apparatus used for severing work, wherein the apparatus comprises an abrasive disc, an electric motor for rotating the disc, and a further motor for moving said abrasive disc to and through the work and returning it to a non-cutting position, the method relating to the control of operation of said further motor and comprising monitoring the electric power required by said electric motor during non-cutting and cutting operations, utilizing the increased amount of power required by said electric motor during cutting operation to set an electrical control circuit, and utilizing the decreased amount of power required by said electric motor following severance of said work to trigger said electrical control circuit and effect operation of said further motor to return said abrasive disc to non-cutting position.

* * * * *